INVENTOR.
James C. Barnes
Alfred S. Gano
Charles W. Hubley
BY
ATTORNEYS

Nov. 11, 1941.   J. C. BARNES ET AL   2,262,156
METHOD AND MEANS FOR ELECTRICALLY COMPENSATING
FOR PHOTOGRAPHIC DISTORTION
Filed June 5, 1940   3 Sheets-Sheet 2
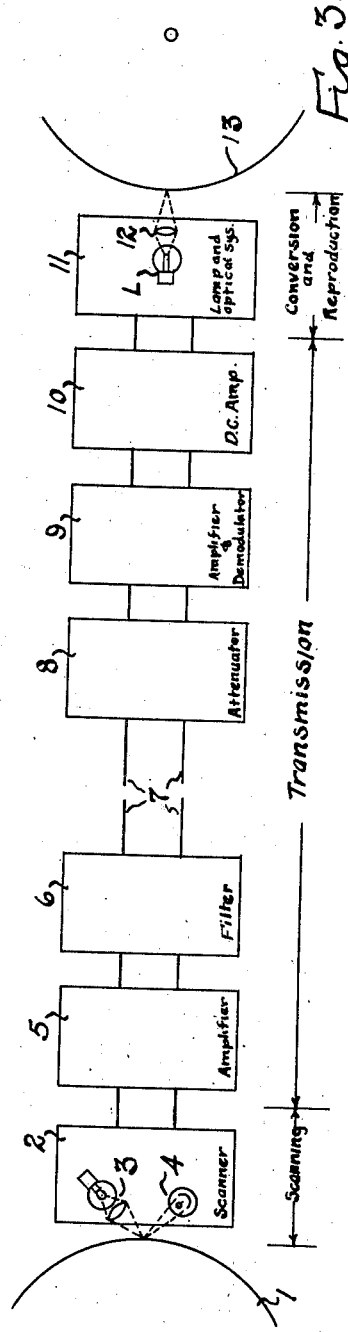
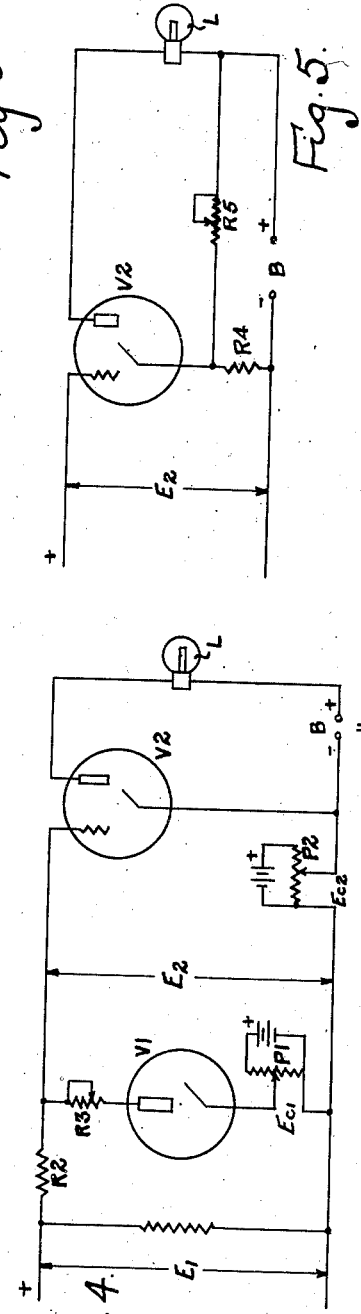
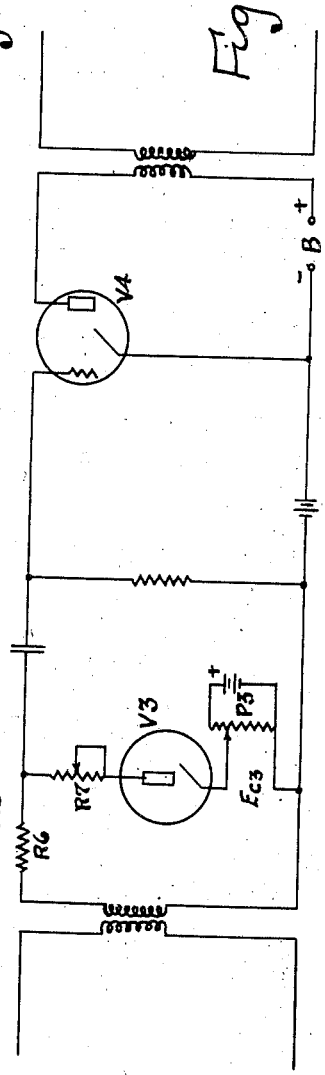
INVENTOR.
James C. Barnes
Alfred S. Gano
Charles W. Hubley
ATTORNEYS Patented Nov. 11, 1941

2,262,156

UNITED STATES PATENT OFFICE 2,262,156

METHOD AND MEANS FOR ELECTRICALLY COMPENSATING FOR PHOTOGRAPHIC DISTORTION

James C. Barnes, White Plains, Alfred S. Gano, Brooklyn, and Charles W. Hubley, Jackson Heights, N. Y., assignors to The Associated Press, New York, N. Y., a corporation of New York Application June 5, 1940, Serial No. 338,858

7 Claims. (Cl. 178—6.7)

A broad object of this invention is the provision of apparatus and methods for making photographic negatives having predetermined densities and ranges thereof so that prints therefrom will have any desired tonal separations throughout.

This invention is more specifically directed to methods and apparatus by means of which compensation for distortion resulting from the non-linear characteristics of photographic negative emulsions, particularly but not necessarily, as employed in telephoto picture transmission, is accomplished.

An immediately useful object of the invention is to provide methods and apparatus for compensating for photographic distortion in the negative produced in apparatus such as telephoto picture transmitting and receiving equipment and resulting, at least in part, from the non-linear response to light of the emulsion of the negative, and within limits, to provide for compensating in the negative for distortion in the print made from the received negative.

The many detailed objects of this invention will be best appreciated, by those skilled in the art, from the following detailed description of the nature thereof.

This invention resides substantially in the combination, construction, arrangement, relative location of parts, steps and series of steps, as will be described in detail below.

In the accompanying drawings,

Figure 1 is a chart showing the desired relations between negative density and electrical signal for faithful negative reproduction in accordance with this invention (curve A), a typical example of the relation between recording lamp current and film density (curve B), and another example, a possible desired relation between negative density and electrical signal (curve C);

Figure 2 is a chart illustrating the electrical transmission characteristics required to effect faithful negative reproduction at the receiving end, that is to provide compensation for the undesired relationship shown by curve B of Figure 1, or in other words to establish as near as practicable the relationship illustrated by curve A of Figure 1, which is accomplished by the invention herein disclosed;

Figure 3 is a diagrammatic illustration of the transmitting and receiving equipment illustrating in a general way the application thereto of this invention in order to accomplish the objects thereof;

Figure 4 is a diagrammatic circuit view of one form of apparatus in accordance with this invention by means of which the objects thereof are accomplished in the system of Figure 3;

Figure 5 is a modified arrangement for the same purpose;

Figure 6 is still another modified form of apparatus in accordance with this invention;

Figure 7:
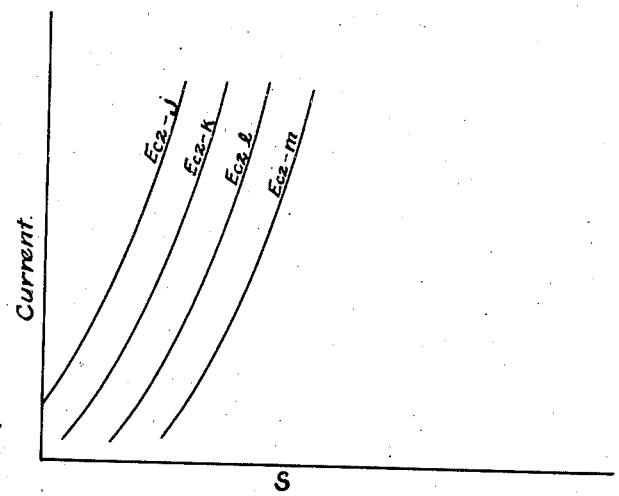
Figure 8:
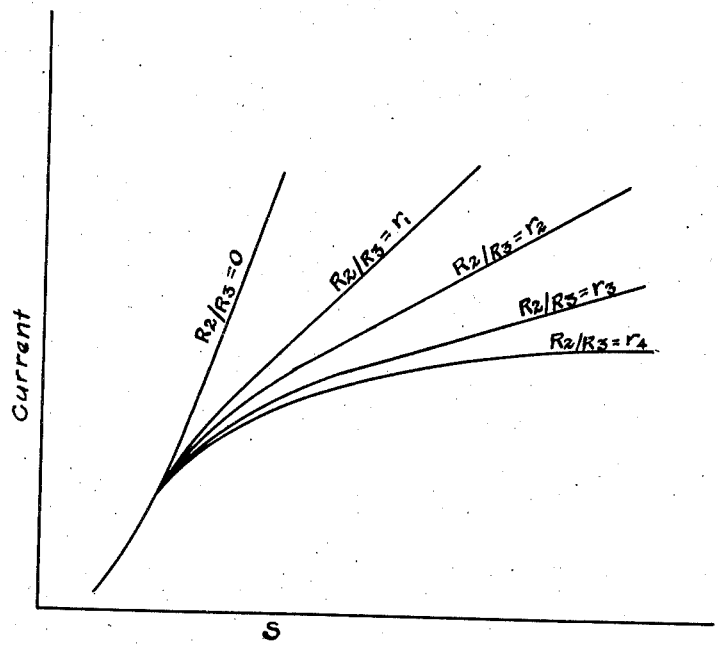

Figure 7 is a chart illustrating the control of the recording lamp current in relation to the signal produced at the recording lamp as obtained by the apparatus of Figures 4 and 5; and Figure 8 is a chart illustrating the control over the relationship between the recording lamp current and the signal produced at the recording lamp as obtained for various ratios between the values of the resistances $R1$ and $R2$ of the circuit of Figure 4.

In a common form of picture transmission system a negative photographic copy is made at one or more receiving points by a process involving the transmission of electrical signals originating at a transmitting point by scanning the elemental areas of a positive print of the picture or scene to be transmitted. In systems of this type certain difficulties such as distortion in the received negative result in part at least from the fact that the light sensitive emulsion of the negative does not have a linear response throughout its range of exposure, i. e., the density of the negative does not bear a linear relation to the log of the exposure as is well known in the art. In systems of the type employing electrical transmission, and in accordance with this invention, means and methods are conveniently provided for controlling the reproduction of the negative at the receiving point or points to compensate for such distortion. Such distortion is commonly apparent in the loss of tone separation in the shadows which results in loss of detail. By reason of the fact that electrical transmission is involved in systems of this type, the possibility of compensation in a practical manner, such as will be described below, is present, whereas it would not be available in the usual photographic copying processes. It is possible, when desired, and within limits, to overcompensate for the non-linearity of response of the light sensitive emulsion of the negative so as to anticipate and eliminate the distortion and photographic losses involved in the production of prints as is necessary from the received negative. Furthermore, when the reproducing element such as the recording lamp or light valve has a non-linear characteristic, i. e., when the relation between input current and light produced is not a linear relation, that condition can be compensated for by means of the invention herein disclosed. Generally speaking, therefore, it is possible, in the electrical portions of the system in accordance with this process, to compensate both for the non-linearity of the recording device, when it exists, and of the receiving emulsion, which condition always exists, and, when desired, to overcompensate to the extent that the losses due to the production of prints from the negative are provided for in advance by, so to speak, distorting the negative in the opposite sense to produce more detail in the shadows by producing greater tone separation to the extent that the final print, notwithstanding losses in its printing, is a faithful reproduction of the original print.

Each area of the picture to be transmitted, which is usually in the form of a photographic print, is characterized by its light reflecting properties, as correspondingly each area of the negative produced from it is characterized by its light transmitting properties. The reflecting properties of the print may be expressed in terms of either the reflection factor or the reflection density. The reflection factor is commonly defined as the ratio of reflected light to the maximum reflected light, that is, the reflected light from its whitest area. The reflection density is commonly defined as the logarithm of the reciprocal of this ratio. The transmission referred to above may be expressed in terms of either the transmission factor or the transmission density. The transmission factor is commonly defined as the ratio of transmitted light to the incident light. The transmission density is commonly defined as the logarithm of the reciprocal of this ratio. In order that the negative be a faithful reproduction of the transmitted print it is required that the difference between the densities of any two areas of the negative bear a linear relation to the difference between the densities of the two corresponding areas of the print. For practical reasons it is further required that the negative densities fall within a certain range of values. The above may be expressed mathematically as follows:

$$DN = DN\ MAX - cD_p$$

where:

DN is the density of the negative.
DN MAX is the maximum density of the negative
$c$ is a proportionality factor governing contrast
$D_p$ is the density of the print.

As is known in this art, a picture is transmitted by successively generating and transmitting electrical signals representing the densities of successive elemental areas of the print, and then converting the transmitted signals to light variations to which is exposed a sensitized emulsion, preferably in the form of a photographic film to successively record these variations at one or more receiving points. There is shown in Figure 3 herein, in a diagrammatic way, a typical system of this kind. The print to be transmitted is attached to a rotatable cylinder 1, which is driven at a suitable speed and in proper relation to which there moves a scanning device indicated at 2. Briefly, the scanning device includes a modulated light source and a lens system 3 for focusing a beam of light to a point on the surface of the print. Suitably positioned with respect to this surface is a photoelectric cell or other light sensitive device 4, which receives the light reflected from the print.

The result is a generated electrical current varying in accordance with the variations in density of the print. This signal current passes through an amplifier 5 and a suitable filter 6 to a transmission line or other transmission medium 7. The application of the invention is, of course, independent of the length of the transmission line. The transmitter and receiver may be located for some uses even in the same room. The signal upon reaching the receiving station or stations passes through a suitable attenuator 8, an amplifier and demodulator 9, a direct current amplifier 10, to the device 11 for converting the signal into light. As illustrated in Figure 3, this conversion is effected by impressing the signals on a suitable recording lamp L, which is generally of the glow light type and is commonly employed in the form known as a crater lamp. The fluctuating light beam thus generated passes through a suitable optical system 13 so as to be focused to a point on the surface of the recording cylinder 13 to which a suitable sensitized film is attached. The recording cylinder 13, of course, is operated in synchronism with the transmitting cylinder 1. At this point it may be noted that there are equivalents of the light source L which are employed for this purpose, and may in conjunction with the invention herein, be employed. For example, the well known light valve in its numerous forms can be used in place of the crater lamp.

From the above those skilled in the art will appreciate that the following steps effect the relation between print density and negative density:

1. The scanning of the print whereby a print density $D_p$ produces an electrical signal S.
2. The electrical transmission of the signal through whatever circuits may be included after the scanner to produce a current I in the signal to light converting device. This may include a modulator at the transmitter if modulated light is not used in scanning.
3. The exposure of the film whereby a current I produces an exposure.
4. The development of the film whereby an exposure produces a negative density DN.

The overall relation between print density and negative density is the combination of the relations of these individual steps.

Figure 1:
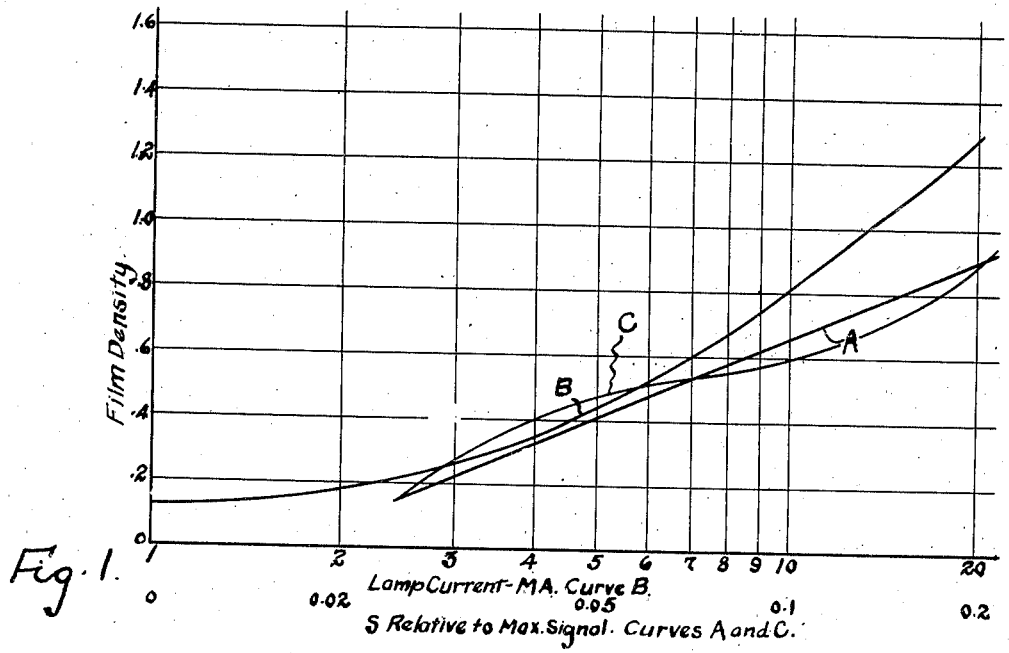

The characteristics of the first two steps may be made either linear or non-linear, by circuit design, whereas the third and fourth steps are inherently non-linear. An experimental characteristic for steps 3 and 4 is shown in Figure 1 in curve B. This type of characteristic in conjunction with a common type of system wherein the signal is linear with respect to the print reflection factor produces a greater separation of high light densities than of shadow densities. Attempts have been made to obtain a film which would not have this type of characteristic, but so far they have been unsuccessful. Therefore, no known method appears to exist for compensating for the inherent non-linear characteristic of the film emulsion. The invention herein disclosed is therefore concerned with the control of step 2, above, to compensate for this inherent undesirable characteristic of steps 3 and 4, and if desired to compensate for the loss in the photographic printing from the received negative, or to obtain in effect any desired characteristic in the response of the emulsion to light.

To find the electrical transmission required to produce a desired overall characteristic, it is necessary to express this characteristic mathematically or graphically, as well as the characteristics of the component steps. Taking for example the case of faithful reproduction, the overall characteristic has already been expressed mathematically. Considering the first step, the scanning signal is proportional to the print reflection and the proportionality constant $c$ may be conveniently made unity by expressing the scanning signal in terms of the scanning signal for unit reflection. Therefore, the print density equals the negative logarithm of the scanner signal. These facts may be expressed mathematically:

$S = R$ (proportionality constant $c=1$)
$D_p = -\log R$ (definition of $D_p$)
$D_p = -\log S$ Where S is signal produced by the scanner
R is the print reflection.

For the case of faithful negative reproduction this may be substituted into the expression:

$$DN = DN\ MAX - cD_p$$

to obtain $$DN = DN\ MAX + c \log S$$

as the desired relation between the scanner signal and negative density. The curve of this equation is plotted in Figure 1 as curve A with $c$ equal to 0.84, this value being chosen for practical reasons. Of course, in the event that a characteristic other than faithful reproduction is desired, this procedure can be modified accordingly.

The relations for the third and fourth steps are fixed by the crater lamp or other equivalent device, and the emulsion of the film. If the mathematical expressions for them were known the required characteristics for the second step could be expressed mathematically. However, it is more convenient and practicable to determine the characteristic of the third and fourth steps experimentally and then obtain the correct characteristic for the second step graphically. The experimental procedure is to operate a receiver with the recording lamp current at a constant value for a sufficient time to scan an area of film large enough so that its density may be conveniently measured when developed. This procedure is repeated for a number of values of lamp current in the operating range of the lamp. These measured densities are then plotted against the current values as is shown in curve B of Figure 1. The actual numerical values for this curve depend upon the optical system and film development. It is assumed that these factors have been selected so that the desired range of film densities is obtained for lamp current values within the working range of the lamp. As for example in one suitable practice the maximum film density is 1.5 and the maximum current is 30 milliamperes.

From curves A and B of Figure 1 the desired relations between S and I can be found as follows: For a given value of scanner signal S find the density by curve A of Figure 1. Then from curve B of Figure 1 find the current I corresponding to this density. This is repeated for other values of the scanner signal and the resulting values of I plotted to give the desired S to I relation. The resulting curve is shown in Figure 2.

Figure 2:
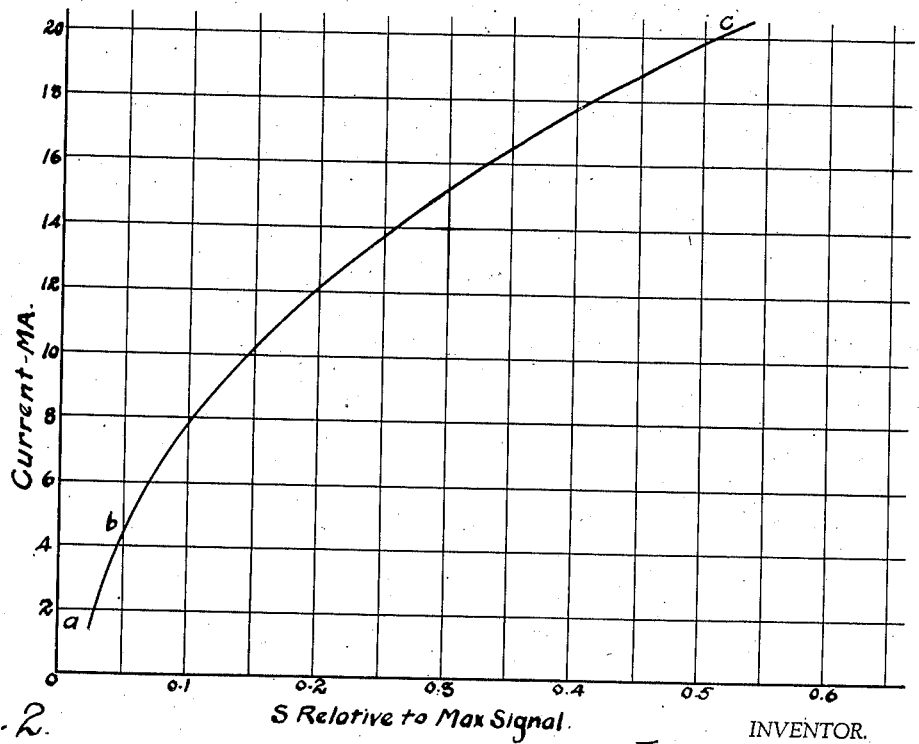

The electrical transmission of the system can be made to have the characteristic of Figure 2 in a number of ways. In the system herein disclosed the transmission is made linear through that portion of the system preceding the demodulator 9 at the receiving end and the desired characteristic as illustrated in Figure 2 is obtained in the D. C. amplifier 10.

It is preferable to accomplish the shaping of the characteristic in accordance with Figure 2 after the demodulator rather than before it. In some cases it may be desirable to effect this shaping at the transmitting end of the system. It will be seen then that it is within the scope of this invention to accomplish this shaping at either end of the line, but preferably at the present time to accomplish it at the receiving end.

There is illustrated in Figure 4 one form of the invention hereof by means of which the desired relationship between S and I may be secured. The crater lamp L by means of which the film at the receiver is exposed is operated in series with the plate electrode of a vacuum tube V2 and the high voltage plate supply which would be connected as indicated at B. This circuit supplies the high D. C. voltage required to initiate operation of the lamp L and supplies a lower D. C. voltage during operation while permitting control of the lamp current by the voltage impressed on the grid of the vacuum tube V2. The current voltage characteristic of the crater lamp, as stated above, is non-linear, and furthermore is unstable and subject to variation in different units. Therefore, it is desirable to arrange the circuit so that the current through the lamp is affected as little as possible by the voltage across the lamp. This is accomplished by selecting the vacuum tube V2 to have a high alternating current plate resistance compared to its direct current plate resistance. Its high alternating current resistance serves to stabilize the current against changes in the lamp voltage drop without requiring increased supply voltage as would be the case if its D. C. resistance were equal to its A. C. resistance.

Figure 7 illustrates the characteristic obtained with this circuit without the inclusion of the vacuum tube V1 and with linear transmission between the scanner and the input terminals of V2, that is at E2. The voltage at $E_{c2}$ shifts the curve horizontally and the potentiometer P2 provides means for changing the value of $E_{c2}$. Thus the curves $j$, $k$, $l$ and $m$ in Figure 7 are for different adjustments of P2 and hence values of $E_{c2}$. The slope of these curves depends upon the transmission characteristic between the scanner and the input of the D. C. amplifier illustrated in Figure 4. By suitably adjusting this transmission the slope may be made to correspond to the slope of the desired characteristic, i. e. of the curve of Figure 2 between the points $a$ and $b$.

At this point it may be noted that the circuit of Figure 5 is an optional circuit wherein the bias voltage for the grid of the vacuum tube V2 is obtained from the plate supply by means of resistances R4 and R5, with R5 adjustable to permit variation of the bias. The resistance R4 common to the input and output circuits provides a negative feedback from the plate circuit to the grid circuit. This increases the A. C. plate resistance of the vacuum tube V2 for the advantage previously pointed out. It is also helpful in straightening the characteristic curve shown in Figure 2.

Having adjusted the circuits of the vacuum tube V2 to approximate the desired characteristic between the points $a$ and $b$ of the curve of Figure 2, provision is made for adjusting the characteristic between the points $b$ and $c$. This is accomplished by connecting across the grid circuit of the vacuum tube V2 a diode VI. The plate thereof is connected to the grid lead of the vacuum tube V2 through an adjustable resistance R3. The cathode thereof is connected to the other side of the grid circuit through a potentiometer PI. A resistance R2 is included in the lead to the plate of the vacuum tube VI. The input voltage $E_1$ is unidirectional and connections are made so that the polarity is as indicated. When the voltage $E_1$ is less than the voltage $E_{c1}$ the plate of VI is negative with respect to this cathode so that no current flows through VI and it is inoperative. Therefore $E_{c1}$ is adjusted to equal the value of $E_1$ which corresponds to the point $b$ on the curve of Figure 2. Hence the characteristic between $a$ and $b$ remains unchanged. For signal values producing voltages $E_1$ greater than $E_{c1}$, the plate of VI is positive with respect to its cathode and current flows through the tube. This causes a voltage drop across resistance R2 and the voltage reaching V2 is decreased by this drop. The effect of VI on the characteristic is controlled by the ratio of R2 to R3, a large ratio producing a large reduction of slope. This is shown in Figure 8 where the values $r_1$ to $r_4$ are increasing. This ratio is set by adjusting R3 to give the best approximation to the desired curve between the points $b$ and $c$. Because of the curvature of the diode characteristic the transition at the point $b$ is not sharp.

This effect of VI on the characteristic might also be obtained by using a biased diode in the part of the electrical system where the signal is in the form of a modulated carrier. This is illustrated in Figure 6, which shows a circuit for accomplishing this connected in the electrical transmission system either in the transmitter or receiver. The operation of V3 is similar to that of VI, $E_{c3}$ determining the minimum signal affected and the ratio of resistance R6 to resistance R7 determining the slope. In this circuit V4 corresponds to V2 of the previous circuits. If desired, two diodes connected as a full wave rectifier would be of advantage in producing less modulation frequencies. Although diodes are shown in Figures 4 and 6, it is to be noted that those skilled in the art will appreciate that other types of rectifiers can be used in their place, such as for example copper oxide rectifiers or other non-linear elements having the desired voltage to current relationship.

In view of the foregoing description it will now be apparent that the invention has a broader aspect than merely the correction of the non-linearity of exposure characteristic of photographic emulsions. As indicated previously, in any system of photographic recording employing an electrically controlled light source it is possible by controlling an electrical current by a signal current representative of pictures to be reproduced for the second current to be given any desired characteristics which will produce in the negative a photographic result of any desired character in relation to tone separation throughout its full exposure. In other words, photographic results may be produced employing the emulsions available and which, of course, have non-linear characteristics such as though the emulsion had any desired characteristics whether they be linear or non-linear. More specifically the emulsion may be made to behave in a non-linear sense but in accordance with a non-linearity which is not the inherent one of such emulsions. This is illustrated for example by curve C of Figure 1. Whereas in the prior description the inherent unavoidable characteristic curve was converted to a straight line represented by the curve A, it can in accordance with this invention be converted to some other curve such as for example curve C. Thus this invention is clearly not limited to compensating for the normal non-linear characteristic by in effect producing a linear result because with the invention non-linear results different from those inherent in the emulsion can be secured by the proper production from the signal current of a recording lamp current which will cause such a result.

From the above description it will be apparent to those skilled in the art that the principles of this invention may be carried out in numerous practical forms. The invention may be used with systems for making half-tone screen negatives, for example. We do not, therefore, desire to be strictly limited to this disclosure as given for illustrative purposes, but rather to the scope of the claims granted us.

What is claimed is:

1. In a picture transmission system for correctly recording a scene on light sensitive emulsions having non-linear light sensitivity, the combination comprising a direct current vacuum tube amplifier having an input circuit and an output circuit, means for supplying signal currents to said input circuit, means connected in said output circuit for producing light variations in accordance with said signal currents, and means in said input circuit for distorting the signal currents to vary the light output of said light producing means to compensate for the non-linearity of the emulsion and thereby correctly record the tonal variations of the original scene.

2. In a picture transmission system, a direct current vacuum tube amplifier including a vacuum tube having a control electrode, a cathode and an anode, an output circuit including said anode and cathode, a current supply source, and means for producing light variations, an output circuit connected to said control electrode and cathode, and means in said input circuit for applying and varying by a picture signal a bias voltage to said control electrode, to produce a linear response in a light sensitive emulsion exposed to said means for producing light variations.

3. In a picture recording system, the combination including a vacuum tube having a control electrode, a cathode and an anode, an output circuit including the anode and the cathode and having in series therewith means for producing light variations and a current source, an input circuit including said control electrode and said cathode, an impedance in said input circuit, and a rectifier shunted across said input circuit between the control electrode and said impedance whereby the light produced by said means in relation to a signal applied to said input circuit is changed so that the exposure response of a light sensitive emulsion thereto is in effect linear.

4. In a picture light recording system, the combination including a vacuum tube having a control electrode, a cathode and an anode, an output circuit including the anode and the cathode and having in series therewith means for producing light variations and a current source, an input circuit including said control electrode and said cathode, an impedance in said input circuit, a rectifier shunted across said input circuit between the control electrode and said impedance, and means for biasing said rectifier whereby the light produced by said means in relation to a signal applied to said input circuit is changed so that the exposure response of a light sensitive emulsion thereto is in effect linear.

5. In a picture light recording system, the combination including a vacuum tube having a control electrode, a cathode and an anode, an output circuit including the anode and the cathode and having in series therewith means for producing light variations and a current source, an input circuit including said control electrode and said cathode, an impedance in said input circuit, a vacuum tube rectifier having an anode and a cathode, means for connecting the anode to the grid of the control electrode between it and said impedance, a variable impedance in said connection, and means connected between the cathode of the rectifier and the other lead of the input circuit for biasing the anode of the rectifier whereby the light produced by said means in relation to a signal applied to said input circuit is changed so that the exposure response of a light sensitive emulsion thereto is in effect linear.

6. In a picture transmitting and photographic recording system for correcting for the distortion in recording due to the non-linear sensitivity of the recording light sensitive emulsion, the combination comprising a source of signal currents representative of the scene to be transmitted and recorded, a transmitting circuit for signal currents from said source, means in said circuit for distorting them to compensate for the non-linearity of a light sensitive recording emulsion, and means for producing light variations when energized by said distorted signal currents, whereby the scene is correctly recorded.

7. In a photographic picture transmitting and recording system for photographically recording a scene on a non-linear light sensitive emulsion, the combination comprising scanning means for producing currents representative of the scene to be recorded, a transmission circuit coupled at its input to the output of the scanning means, a vacuum tube amplifier in said transmission circuit, means connected to the input of said amplifier for distorting the signal currents to compensate for the non-linear sensitivity of the recording emulsion, and means for producing light variations to which the sensitized emulsion is to be exposed connected to the output of said transmission circuit whereby the original scene is correctly recorded.

JAMES C. BARNES.
ALFRED S. GANO.
CHARLES W. HUBLEY.